United States Patent

[11] 3,633,657

[72] Inventors James N. Brooks
Hermosa Beach;
William W. Chambers, Anaheim, both of Calif.
[21] Appl. No. 44,086
[22] Filed June 8, 1970
[45] Patented Jan. 11, 1972
[73] Assignee Robertshaw Controls Company
Richmond, Va.

[54] TEMPERATURE CONTROL APPARATUS HAVING COOLING OPERATOR SEPARATE FROM SENSING BRIDGE
7 Claims, 1 Drawing Fig.
[52] U.S. Cl. .................................................... 165/26, 236/78
[51] Int. Cl. ............................................. F25b 29/00
[50] Field of Search ........................................... 165/26; 236/78, 78 D

[56] References Cited
UNITED STATES PATENTS
3,292,687  12/1966  Evans ......................... 165/26
3,371,708  3/1968  Chaparro ..................... 165/26

Primary Examiner—Charles Sukalo
Attorney—Fulwider, Patton, Rieber, Lee & Utecht

ABSTRACT: A temperature control apparatus including an AC bridge formed by four legs connected together to form first, second, third and fourth nodes. One of the legs is in the form of a temperature responsive resistor and a second leg includes a heating operator for operating a heating system. A cooling operator is provided for selectively operating a cooling system. A gate-controlled conduction device is incorporated in the bridge for controlling current to the operators and includes an anode and cathode. Respective first, second and third lead means connects the cathode with the first node, the gate with the second node, the anode with the third node and fourth lead means connects the cooling operator between such anode and the fourth node. Current-directing means is provided for selectively directing current through the third or fourth leads whereby unbalance of the bridge in response to cooling of the temperature responsive resistor will trigger the conduction device and initiate current flow in the heating operator and unbalance of the bridge in response to heating of such temperature responsive resistor will also trigger the conduction device and initiate current flow through the cooling operator without substantially changing the current flow in the temperature responsive resistor to thereby avoid any change in self-heating thereof.

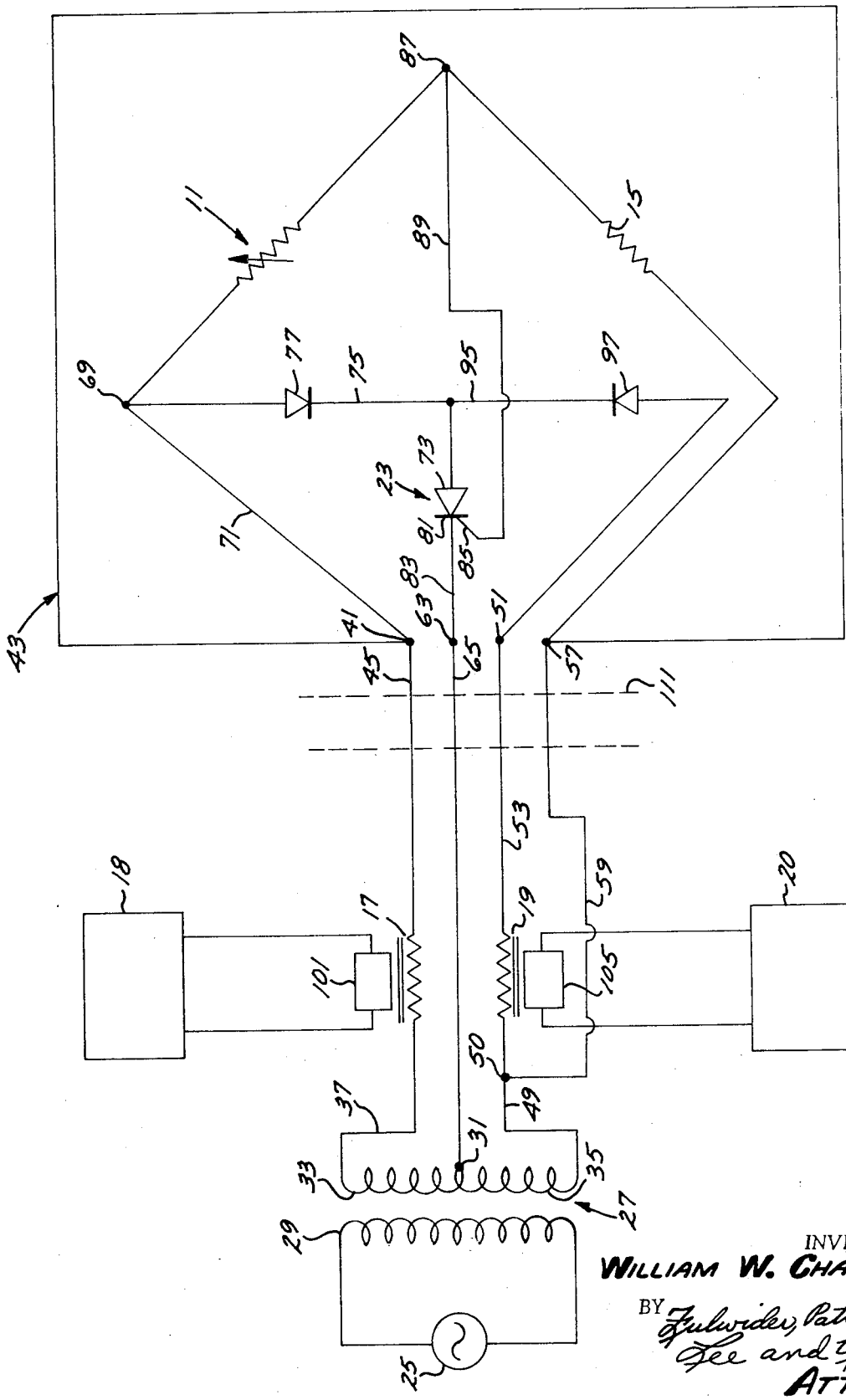

TEMPERATURE CONTROL APPARATUS HAVING COOLING OPERATOR SEPARATE FROM SENSING BRIDGE

BACKGROUND OF THE INVENTION

1. Field of the Invention

The temperature control apparatus of present invention relates to a system for controlling both a heating system and a cooling system to maintain an environment in a predetermined temperature range.

2. Description of the Prior Art

Temperature control apparatuses have been proposed which include temperature responsive bridges for selectively triggering a conduction device to selectively control current flow through either a heating operator or a cooling operator disposed outside the bridge. A temperature control apparatus of this type is shown in U.S. Pat. No. 3,211,214. Temperature control systems of this type suffer the shortcoming of requiring a minimum of five electrical leads leading from the heating and cooling operators to the temperature responsive portion of the bridge. Other temperature control devices have been proposed which incorporate both the heating and cooling operators in the legs of a temperature-sensitive bridge but these devices have the shortcoming of reducing the voltage across the temperature-sensing leg of the bridge when current flow through the cooling operator is initiated thereby reducing the self-heating of such leg and giving a false indication that the environment being sensed has already been cooled.

SUMMARY OF THE INVENTION

The temperature control apparatus of present invention is characterized by a temperature-responsive AC bridge incorporating a temperature-responsive resistor in one leg thereof and a heating system operator in a second leg thereof. A cooling system operator is connected with one node of the bridge but is not incorporated in the bridge itself. A gate-triggered conduction device is connected with the bridge and is responsive to the temperature of the temperature-responsive resistor falling above or below a predetermined temperature to initiate current flow. Current-directing means is provided for directing current through the heating system operator when such temperature drops below the selected temperature and through the cooling system operator when the temperature rises above such selected temperature.

An object of the present invention is to provide a temperature control apparatus of the type described which requires only a minimum number of leads to be run between the temperature-responsive portion of the bridge and the cooling and heating operators to thereby reduce the amount of work required for installation thereof and the possibility of incorrect wiring at the installation site.

Another object of the present invention is to provide a temperature control apparatus of the tube described wherein the cooling operator is disposed outside the temperature-responsive bridge to avoid altering current flow in the temperature-sensing leg of such bridge when current flow through the cooling operator is initiated to thereby avoid any false indication that the temperature being controlled has been altered.

These and other objects and the advantages of the present invention will become apparent from a consideration of the following detailed description when taken in conjunction with the accompanying drawing.

DESCRIPTION OF THE DRAWING

The single FIGURE in the drawing is a schematic of a temperature control apparatus embodying the present invention.

DESCRIPTION OF THE PREFERRED EMBODIMENT

The temperature control apparatus of present invention includes a temperature-responsive bridge, generally designated 11, having one leg thereof formed by a thermistor 15 and a second leg thereof formed by a resistor 17 for operating a heating system 18. A resistor 19 is provided for operating a cooling system 20 and is connected with the bridge 11 but is not incorporated therein. A gate-controlled conduction device in the form os a silicon-controlled rectifier (SCR), generally designated 23, is connected with the bridge and is responsive to the temperature-sensitive resistor 15 falling below a predetermined temperature to initiate current flow in the heating system resistor 17 and is responsive to the temperature of such temperature-sensitive resistor 15 rising above such selected temperature to initiate current flow in the cooling system resistor 19 to initiate cooling. Since the cooling system resistor 19 is not incorporated in the bridge 11, initiation of current flow thereto will not substantially affect the voltage across, or current flow in, the temperature-sensitive resistor 15 thereby avoiding any variation in self-heating thereof which may give a false indication that the temperature being sensed has already been reduced.

The AC bridge 11 is adapted to be connected with an AC source 25 by means of a transformer, generally designated 27. The transformer 27 includes a primary coil 29 and a secondary coil which is center tapped at a node 31 to form two separate secondary coil halves 33 and 35. The upper end of the top coil half 33 is connected with one end of the heating resistor 17 by means of a lead 37 and the opposite end of such resistor is connected with a terminal 41 of a thermostat 43 mounting a portion of the bridge 11 by means of a lead 45.

It is noted that one leg of the bridge 11 is formed by the coil half 33 and resistor 17, a second leg is formed by the coil half 35, a third leg is formed by the temperature-responsive resistor 15 which is preferably a thermistor, and the fourth leg is formed by a variable resistor 47 which may be adjusted to set the desired temperature.

The lower end of the lower secondary coil half 35 is connected with a terminal 50 at one end of the cooling resistor 19 and the opposite end of such cooling resistor is connected with a second terminal 51 of the thermostat 43 by means of a lead 53. The cooling resistor terminal 50 is also connected with a third terminal 57 of the thermostat 43 by means of a lead 59 arranged in parallel with such resistor. The center tap 31 formed between the coil halves 33 and 35 is connected with a fourth terminal 63 of the thermostat 43 by means of a lead 65.

The thermostat terminal 41 is connected with a bridge node 69 by means of a lead 71 and such node is connected with the anode 73 of the SCR 23 by means of a lead 75 which includes a current directing diode 77 therein. The cathode 81 of the SCR 23 is connected with the thermostat terminal 53 by means of a lead 83. The gate 85 of the SCR 23 is connected with a bridge node 87 by means of a lead 89.

The anode 73 of the SCR 23 is also connected with the cooling resistor 19 by means of a lead 95 leading to the thermostat terminal 51 and including a blocking diode 97. It will be apparent from the further discussion that the blocking diodes 77 and 97 may be replaced by a manual switch that may be switched to selectively connect the anode SCR 73 with either the heating resistor 17 or the cooling resistor 19 depending on whether heating or cooling is desired.

The heater 18 has current thereto controlled by means of a thermostatic switch 101 disposed in heat exchange relationship with the heating resistor 17 whereby when such thermostatic switch is heated the heating unit 18 will be energized to heat the environment sensed by the thermistor 15. Similarly, current to the cooling unit 20 is controlled by a thermostatic switch 105 disposed in heat exchange relationship with the cooling resistor 19.

When temperature control apparatus of present invention is to be installed in a residence, or the like, the thermostat 43 is normally placed in the room in which the temperature is to be controlled such that the thermistor 15 will sense the room temperature and the adjustable resistor 47 will be easily accessible for convenient adjustment of the thermostat to set the temperature at the desired level. The transformer 27 and operator resistors 17 and 19 are then normally spaced some distance away, for instance, in the basement or the like, and the leads 45, 65, 53 and 59 are then installed leading from the thermostat 43 to such remotely located elements. As an example, such leads are shown as projecting through a floor 111 forming the basement ceiling.

The adjustable resistor 47 may be set to raise or lower the resistance in the bridge leg defined thereby to set the temperature at which the ridge 11 is balanced to thereby maintain the room at such temperature. Thereafter, if the room temperature falls below such selected temperature and cools the thermistor 15, the resistance in the bridge leg defined thereby will become greater thereby causing the bridge node 87 to become positive with respect to the bridge node 37 when the top end of the coil half 33 is positive with respect to the bottom end. When the resistance of the thermistor 15 increased sufficiently to cause the node 87 to be sufficiently positive with respect to the node 31 to drive the gate 85 sufficiently positive with respect to the cathode 81 to trigger the SCR 23, such SCR will be rendered conductive during the half cycle the top end of the transformer 27 is positive with respect to the bottom end.

On the subsequent half cycle the bottom end of the transformer 27 will be positive with respect to the top end and the unbalance in the bridge 11 caused by the increased resistance of the resistor 15 will cause the node 87 to be negative with respect to the center tap node 37 thereby preventing the SCR 23 from firing during that half cycle. HOwever, on the subsequent half cycle, when the top end of the transformer 27 is positive with respect to the bottom end, the SCR 23 will again fire and be rendered conductive to permit current flow from the top end of the transformer coil 33 through the resistor 17, diode 77, SCR 23 and back to the center tap 31 of the secondary transformer coil. Consequently, the thermostatic switch 10 will be heated to close and energize the heating unit 18 to heat the temperature being sensed by the thermistor 15 and when such thermistor has been heated sufficiently to increase the temperature thereof to the selected temperature, the bridge 11 will be rebalanced thereby discontinuing triggering of the SCR 23 and causing such SCR to block current flow through the heating resistor 17.

If the temperature being sensed increases above the selected temperature, the resistance of the thermistor 15 will be decreased to unbalance the bridge 11 and when the bottom end of the transformer coil 35 is positive with respect to the top end, the node 87 will be positive with respect to the center tap transformer node 31 thereby rendering the SCR gate 85 positive with respect to the cathode 81. Concurrently, current through the cooling resistor 19, lead 53, and diode 97 will render the anode 73 positive with respect to the cathode 81 and when the current to the gate 85 exceeds the triggering current, the SCR 23 will be rendered conductive thereby initiating current flow from the bottom end of the coil 35, through the cooling resistor 19, diode 97, SCR 23 and back to the center tap node 31. It is of particular importance that the voltage across the composite secondary coil of the transformer 27 remains applied to the bridge 11 to thereby maintain substantially the same current passing through the thermistor 15 as passed therethrough previous to firing of the SCR 23. Accordingly, the inherent self-heating of the thermistor 15 will remain substantially constant and will be relatively unaffected by triggering of the SCR thereby preventing the current drop which would be experienced if the cooling resistor 19 were connected in series between the coil 35 and the thermistor 15 to form a portion of one bridge leg.

On the subsequent half cycle when the top end of the secondary transformer coil is negative with respect to the bottom end, the node 87 will be negative with respect to the node 31 and, consequently, the gate 85 negative with respect to the cathode 81 thereby preventing triggering of the SCR 23. However, on the subsequent half cycle, the gate 85 will again be positive with respect to the cathode 81 and the SCR 23 will be triggered to conduct another pulse of current through the cooling resistor 19.

The current through the cooling resistor 19 will heat the thermostatic blade 105 to thereby close the circuit through the cooling unit 20 to initiate cooling of the room, of which the temperature is sensed by the thermostat 43, and the thermistor 15 will be cooled to eventually return to the selected temperature thereby rebalancing the bridge 11 and rendering the SCR 23 nonconductive.

From the foregoing detailed description, it will be apparent that the temperature control apparatus of present invention provides a thermostat for sensing a room temperature and which may be connected with a remotely located power source and cooling and heating operators with only four electrical leads and the cooling operator is located outside the thermostat bridge to thereby avoid variations in self-heating of the temperature-sensitive resistor as a result of energization of such cooling operator.

Various modifications and changes may be made with regard to the foregoing detailed description without departing from the spirit of the invention.

The embodiments of the present invention in which an exclusive property or privilege is claimed are defined as follows:

1. Temperature control apparatus comprising:
    a bridge including four legs connected together to form first, second, third and fourth nodes therebetween, one of said legs including a temperature-responsive resistor for sensing a temperature to be controlled and a second of said legs including a heating operator for operating a heating system to heat said temperature;
    a cooling operator separate from said bridge for selectively operating a cooling system;
    a gate-controlled conduction device including an anode and cathode;
    first lead means connecting said cathode with said first node;
    second lead means connecting the gate of said conduction device with said second node;
    third lead means connecting the anode of said conduction device with said third node;
    fourth lead means connecting said cooling operator between said anode and said fourth node; and
    current-directing means for selectively directing current through said third or fourth leads whereby said bridge may be connected with an AC power source and cooling of said temperature-responsive resistor below a selected temperature will unbalance said bridge in one direction to impose a triggering current on said gate to initiate flow through said third lead means and said second leg to energize said heating operator and, alternately, heating of said temperature responsive resistor above said selected temperature will unbalance said bridge in a second direction to impose a triggering signal on said gate to commence current flow through said fourth lead means and said cooling operator while maintaining the current flow through said temperature-sensitive resistor substantially constant to thereby avoid any changes in self-heating thereof.

2. Temperature control apparatus as set forth in claim 1 that includes:
    a thermostat housing and wherein;
    said one leg of said bridge, said conduction device and said current directing means are arranged in closely spaced relationship and are mounted on said thermostat housing and wherein;
    said bridge includes a first electrical terminal connected with said one leg, a second electrical terminal connected with said third node, a third electrical terminal connected with said cathode and a fourth electrical terminal connected with said anode whereby said heating and cooling operators and the fourth leg of said bridge may be located remotely from said thermostat housing and said first, second, third and fourth terminals connected with said respective fourth leg, heating operator, first node and cooling operator with only four electrical leads.

3. Temperature control apparatus as set forth in claim 1 wherein:
said current-directing means includes a pair of diodes connected in said respective third and fourth lead means for blocking current flow from said anode.

4. Temperature control apparatus as set forth in claim 1 wherein:
one leg of said bridge includes a variable resistor for being adjusted to select said selected temperature.

5. Temperature control apparatus as set forth in claim 2 wherein:
said current-directing means includes a pair of diodes connected in said respective third and fourth lead means for blocking current flow from said anode.

6. Temperature control apparatus as set forth in claim 2 wherein:
one leg of said bridge includes a variable resistor for being adjusted to select said selected temperature.

7. Temperature control apparatus as set forth in claim 3 wherein:
one leg of said bridge includes a variable resistor for being adjusted to select said selected temperature.

* * * * *